(12) United States Patent
Oh (10) Patent No.: US 9,226,046 B2
(45) Date of Patent: Dec. 29, 2015

(54) METHOD AND DEVICE FOR EXECUTING APPLICATION RELATED A/V CONTENT

(75) Inventor: Joon-Hee Oh, Seoul (KR)

(73) Assignee: ALTICAST CORP., Seoul (KR)

( * ) Notice: Subject to any disclaimer, the term of this patent is extended or adjusted under 35 U.S.C. 154(b) by 591 days.

(21) Appl. No.: 13/339,941

(22) Filed: Dec. 29, 2011

(65) Prior Publication Data

US 2012/0173665 A1    Jul. 5, 2012

(30) Foreign Application Priority Data

Dec. 31, 2010  (KR) .................. 10-2010-0139792

(51) Int. Cl.
```
G06F 15/16      (2006.01)
H04N 21/81      (2011.01)
H04N 21/258     (2011.01)
H04N 21/8352    (2011.01)
H04N 21/84      (2011.01)
H04N 21/475     (2011.01)
```

(52) U.S. Cl.
CPC ..... *H04N 21/8173* (2013.01); *H04N 21/25833* (2013.01); *H04N 21/25858* (2013.01); *H04N 21/8352* (2013.01); *H04N 21/8402* (2013.01); *H04N 21/4758* (2013.01)

(58) Field of Classification Search
CPC .................. H04N 21/25833; H04N 21/25858; H04N 21/8402; H04N 21/8173; H04N 21/8352; H04N 21/4758
USPC ........................................................ 709/224
See application file for complete search history.

(56) References Cited

U.S. PATENT DOCUMENTS

| | | | |
|---|---|---|---|
| 2005/0066325 | A1 | 3/2005 | Mori et al. |
| 2006/0168574 | A1* | 7/2006 | Giannini et al. .............. 717/168 |
| 2007/0180051 | A1 | 8/2007 | Kelly et al. |
| 2007/0204300 | A1* | 8/2007 | Markley ............ H04N 7/17318 725/46 |
| 2007/0233999 | A1* | 10/2007 | Jerding et al. ................ 711/171 |

(Continued)

FOREIGN PATENT DOCUMENTS

| | | |
|---|---|---|
| JP | 2003-223387 A | 8/2003 |
| JP | 2006-211615 A | 8/2006 |
| KR | 10-2008-0093725 A | 10/2008 |
| KR | 10-2008-0098588 A | 11/2008 |

OTHER PUBLICATIONS

"Adobe Flash Player Administration Guide for Flash Player 8 and Flash Player 9", Adobe Technical Paper, Oct. 1, 2008, pp. 1-88, San Jose, California.

*Primary Examiner* — Hee Soo Kim
(74) *Attorney, Agent, or Firm* — Jefferson IP Law, LLP (57) ABSTRACT

A device and method for executing an application related to Audio/Video (A/V) content are provided. The device includes a controller for obtaining an identifier of the application, for sending a query message including the identifier and platform information of the device to a download server having a predefined address, for receiving a response message to the query message, and for executing the application based on the response message, and a transceiver for performing an operation of sending and receiving the query message and the response message, thereby making it possible to provide applications related to A/V content to all types of application execution devices regardless of the types of platforms of the devices. Thus, A/V content providers may provide applications to A/V content consumers without the limitations on the data broadcasting networks and the recording capacity of the media.

21 Claims, 4 Drawing Sheets

(56) References Cited

U.S. PATENT DOCUMENTS

2008/0040767 A1* 2/2008 McCarthy et al. ............ 725/132
2008/0201748 A1* 8/2008 Hasek ................ H04N 7/17309
                                                        725/98
2009/0055881 A1* 2/2009 Aoki .................... H04N 21/435
                                                        725/100
2010/0154009 A1* 6/2010 Del Sordo ....................... 725/62
2010/0313236 A1* 12/2010 Straub ........................... 725/146

* cited by examiner

METHOD AND DEVICE FOR EXECUTING
APPLICATION RELATED A/V CONTENT

PRIORITY

This application claims the benefit under 35 U.S.C. §119 (a) of a Korean patent application filed in the Korean Intellectual Property Office on Dec. 31, 2010 and assigned Serial No. 10-2010-0139792, the entire disclosure of which is hereby incorporated by reference.

BACKGROUND OF THE INVENTION

1. Field of the Invention

The present invention relates generally to a method and device for executing applications related to Audio/Video (A/V) content. More particularly, the present invention relates to a method and device in which various devices with different platforms may easily execute applications related to A/V content.

2. Description of the Related Art

The development of digital technology and broadcast service technology has made it possible to provide high-quality, multi-channel, multi-functional, interactive broadcast services and high-definition video media by data broadcasting.

A user (e.g., consumer) viewing (e.g., consuming) A/V content may receive a variety of additional information and services related to the A/V content by executing applications related to the A/V content while viewing the A/V content. For example, a user viewing A/V content such as a drama through media such as a data broadcast may want to obtain details about the clothes an actor featured in the drama wears or about the location of the drama. Similarly, a consumer of A/V content such as a live music ranking program may want to take part in a poll for ranking the music. Likewise, a consumer consuming A/V content such as an animation through media such as a Digital Versatile Disk (DVD) may want to enjoy games in which the animation is used as a material thereof.

Considering these needs of the A/V content consumers, A/V content providers provide various types of applications related to A/V content. The A/V content providers may provide, for example, an application for viewing additional information about a drama, a viewer poll application for music rankings, an additional application in which an animation is used as a material thereof, etc.

Generally, the A/V content consumers directly search for A/V content-related information or applications on a separate device (e.g., a Personal Computer (PC)) connected to the network, which inconveniences both the A/V content providers and the A/V content consumers.

Accordingly, the recent technology is specific to the media on which A/V content is delivered as well as the devices where the A/V content is consumed. Also, technology standards regarding delivery of not only A/V content but also applications related to the A/V content are defined such as Open Cable Application Platform (OCAP) standard in digital broadcast, and Blu-ray Disc Java (BD-J) standard for Blu-ray discs.

When provided in this manner, the applications may use broadcast transmission resources for broadcasting of A/V content, or recording media such as a Blu-ray disc for providing A/V content. However, resources are inevitably limited in transmission of the applications, and even for recording media such as the Blu-ray disc the recording capacity is limited, thus making it difficult to provide applications for users due to, for example, the limitations on transmission bandwidth, the high fees, etc.

Since A/V content consumers may execute applications on various types of devices such as a set-top box, a DVD player, a personal mobile device, and the like, and the areas where the A/V content is to be serviced are not limited, it is very difficult in reality for the A/V content providers to determine in advance the transmission media on which applications related to A/V content are to be transmitted, the execution environment (e.g., a platform of the device) where the applications are to be executed, the user language in which the applications are to be produced and distributed, and the like. Therefore, there is a need for a method and device in which an A/V content consumer may download and execute an application related to A/V content upon detecting the presence of the application related to the A/V content at the time the A/V content is consumed.

SUMMARY OF THE INVENTION

Aspects of the present invention are to address at least the above-mentioned problems and/or disadvantages and to provide at least the advantages described below. Accordingly, an aspect of the present invention is to provide a method and device in which an Audio/Visual (A/V) content consumer may download and execute an application related to A/V content upon detecting the presence of the application related to the A/V content at the time the A/V content is consumed.

Another aspect of the present invention is to provide an application execution method and device in which transmission resources for transmission of an application related to A/V content are not limited.

Another aspect of the present invention is to provide an application execution method and device in which application execution devices with different execution environments may execute applications appropriate for their device environments.

Another aspect of the present invention is to provide a method and device for downloading and executing an application related to A/V content in another device (e.g., a second device) connected to a device that receives and consumes A/V content.

Another aspect of the present invention is to provide an application execution method and device for allowing servers capable of downloading an application related to A/V content to be distributed, and for allowing an application execution device to download and execute an application by communicating with a download server where the application is located.

In accordance with one aspect of the present invention, a device for executing an application related to Audio/Video (A/V) content is provided. The device includes a controller for obtaining an identifier of the application, for sending a query message including the identifier and platform information of the device to a download server having a predefined address, for receiving a response message to the query message, and for executing the application based on the response message, and a transceiver for sending the query message and for receiving the response message, and a transceiver for sending the query message and for receiving the response message.

In accordance with another aspect of the present invention, a method of controlling a device for executing an application related to Audio/Video (A/V) content is provided. The method includes obtaining an identifier of the application, sending a query message including the identifier and platform information of the device to a download server having a predefined address, receiving a response message to the query message, and executing the application based on the response message.

In accordance with yet another aspect of the present invention, a method for providing an application related to Audio/Video (A/V) content in a download server device is provided. The method includes receiving a query message including an identifier of the application and platform information of an application execution device, from the application execution device, and sending a response message to the query message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to a description of exemplary embodiments of the present invention, definitions of the terms used herein will be given below.

The term "Audio/Video (A/V) content" as used herein may refer to any type of audio-visual production, and may be any type of A/V content unless stated otherwise. Although it will be assumed herein that programs provided over the data broadcasting network and movies provided through channels, Digital Video Disk (DVD) media, Blu-ray media, etc. are given as examples of the A/V content, it is not intended to limit the scope of the invention to these examples.

The term "transmission media of A/V content" as used herein may refer to media capable of transmitting A/V content, and may be any type of transmission media unless stated otherwise. Although it is provided herein that communication media such as an internet network, a cable broadcasting network and a satellite broadcasting network, and recording media loaded in a media play device such as a Blue-Ray disc, a DVD disc and a Universal Serial Bus (USB) memory device are given as examples of the transmission media of A/V content, it is not intended to limit the scope of the invention to these examples.

The term "application execution device" as used herein may refer to any type of device capable of executing or running applications related (or linked) to A/V content. Although it is provided herein that a set-top box (typical example of a device for receiving data broadcast), a Television (TV) receiver capable of receiving data broadcast, a Personal Computer (PC) capable of receiving data broadcast, personal mobile terminal devices (e.g., a mobile phone, a Personal Digital Assistance (PDA), and a smart phone) capable of communication with an external network, and media players connected to a home network such as a DVD player and a Blu-ray player are given as examples of an application execution device, it is not intended to limit the scope of the invention to these examples.

For example, a user, who is viewing A/V content, received through a set-top box, on a TV receiver, may execute an application related to the A/V content in the set-top box and determine the execution results on the TV receiver, or may execute an application related to the A/V content on a smart phone connected to the set-top box and determine the execution results on a screen of the smart phone.

As another example, a user, who is viewing A/V content, recorded in DVD media, on a DVD player, may execute an application related to the A/V content on the DVD player and determine the execution results on a TV receiver, or may execute an application related to the A/V content on a smart phone connected to the DVD player and determine the execution results on a screen of the smart phone.

Figure 1:
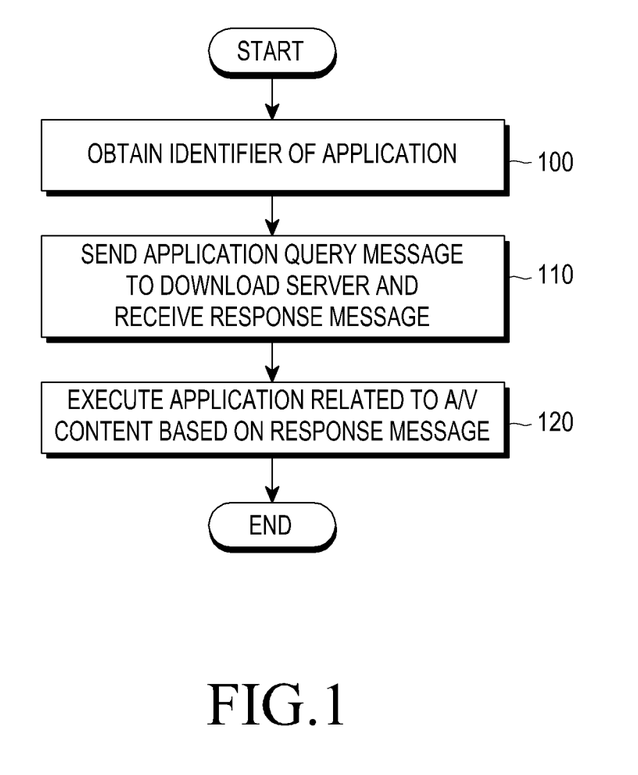
FIG. 1 illustrates a method for executing an application related to Audio/Visual (A/V) content in an application execution device according to an exemplary embodiment of the present invention.

FIG. 1 illustrates a method for executing an application related to A/V content in an application execution device according to an exemplary embodiment of the present invention.

Referring to FIG. 1, in step 100, the application execution device obtains an identifier of an application related to A/V content through any of various routes.

The identifier of the application may be any type of information for allowing the application execution device to access the application. For example, the identifier of the application may include a combination of a first part "eap://www.cnn.com/news/international/", which identifies the A/V content, and a second part "app1021", which identifies the application, which results in "eap://www.cnn.com/news/international/app1021". Optionally, when there is only one application related to specific A/V content, the identifier of the application may include only a part (i.e., content identifier) for identifying content.

In an exemplary embodiment, if the application execution device is a data broadcast receiving device (e.g., a set-top box), the application execution device may obtain the identifier of the application along with A/V content through the data broadcasting network (i.e., the same media as the A/V content transmission media). For example, the identifier of the application may be received after being embedded in a Vertical Blanking Interval (VBI) region or a user data region in a video stream of the A/V content transmitted over the data broadcasting network, or may be received after being included in a Moving Picture Experts Group 2 (MPEG-2) stream as a separate Packet Identifier (PID). Optionally, if the identifier of the application is not received along with the A/V content, the application execution device may obtain the identifier of the application by performing Internet Protocol (IP) communication with an external server over the connected network based on the information about the A/V content.

In an exemplary implementation, if the application execution device is a media play device (e.g., a DVD player), the application execution device may obtain the identifier of the application by reading the identifier of the application recorded in the media in which the A/V content is recorded (i.e., through the same media as the A/V content transmission media). Optionally, if the identifier of the application is not recorded in the media, the application execution device may obtain the identifier of the application by performing Internet Protocol (IP) communication with the external server over the connected network based on the information about the A/V content.

In another exemplary implementation, if the application execution device is a mobile terminal device (e.g., a smart phone), the application execution device may obtain the identifier of the application from the data broadcast receiving device or the media play device that has already obtained the identifier of the application, through various types of wireless communication protocols. Optionally, wireless communication between the mobile terminal device and the data broadcast receiving device or the media play device may be implemented based on a communication standard such as Bluetooth or Digital Living Network Alliance (DLNA) which is a kind of communication scheme that shares data between home network devices in accordance with standard communication specifications such as IP, Hypertext Transfer Protocol (HTTP), Wi-Fi, and the like. Optionally, in order for the mobile terminal device to obtain the identifier of the application from the data broadcast receiving device or the media play device, a process of registering in advance the mobile terminal device in the data broadcast receiving device or the media play device may be used.

The identifier of the application is information that is independent of (or irrelevant to) a platform of the application execution device. Since the identifier of the application that the application execution device obtains is independent of the type of the platform of the application execution device, a plurality of application execution devices whose users are viewing the same A/V content may all obtain the same identifier of the application.

In step 110, the application execution device sends a query message including the obtained application identifier information and its platform information to a download server, and receives a response message to the query message from the download server. Optionally, the query message may include information about the user language of the application execution device, information about the media on which the A/V content is transmitted, and the like.

Because the application execution device transmits the application identifier independent of its platform and its platform information to the download server using a query message, any application execution device may obtain and execute the application using the same procedure regardless of its platform. In other words, each application execution device may download an application by transmitting the application identifier and its platform information with a query message. Optionally, when the query message includes additional information such as the user language of the application execution device, the transmission media of the A/V content, and the like, the application execution device may download a response message including information about the application appropriate for the additional information such as the user language, the transmission media, and the like.

An address of the download server to which the application execution device will send a query message may be a predetermined address, or optionally may be an address the application execution device has obtained in the process of obtaining the application identifier information.

Optionally, the predetermined address of the download server may be set depending on the platform type of the application execution device, the geographic location of the application execution device, and the like. For example, if the application execution device is a mobile terminal device such as a smart phone, the predetermined address of the download server may be determined in advance as a download server such as Apple AppStore™, Google Android Market™, or others according to the platform of the application execution device. Each application execution device may send and receive a query message and a response message to/from an address of a download server located geographically close thereto, thus making it possible to expect faster download of applications.

A response message to the query message may optionally include at least one of version information, type and billing information (in the case of a paid application) of an application indicated by an application identifier included in the query message, location information (e.g., Uniform Resource Locator (URL) or an IP address) of a download server, an execution file, and the like. The application type information is information indicating whether the application is an application linked to data broadcast channels, or an application linked to data broadcast programs.

In step 120, the application execution device executes an application related to A/V content based on the received response message.

Optionally, if the response message includes application version information, the application execution device may execute the application only when the application version information included in the response message is valid, determining the application as a valid application. On the other hand, if the application version information included in the response message is not valid, the application execution device may perform no operation, determining that the application is invalid.

Optionally, if it is determined that the application version information included in the response message is valid, the application execution device may output a User Interface (UI), for allowing the user to determine whether to execute the application, on its display (in the case of a mobile terminal device) or a display device connected thereto (in the case of a set-top box or a media player). The UI may be output on the screen in the form of an icon, or may be provided to the mobile terminal device in the form of a text message. The application execution device may be controlled to perform the next step only when the user agrees to execute the application.

If the received response message includes an application execution file, the application execution device may execute the application by executing the application execution file.

In an exemplary implementation, a response message to the query message may not include an application execution file in order that a procedure for determining whether the application is up-to-date may be performed before downloading an execution file. In other words, because the downloading of the execution file takes a relatively long time, it may save time to first determine if a previously downloaded application is up-to-date. In this case, after performing a process of sending a query message and receiving a response message thereto, if the application version information is not the same as that of a previously downloaded application of the same application identifier, the application execution device may perform the application by receiving an application execution file in the response message to the request message. If the application version information is the same as that of a previously downloaded application of the same application identifier, the application execution device may perform the previously downloaded application of the same application identifier without requesting the application.

Figure 2:
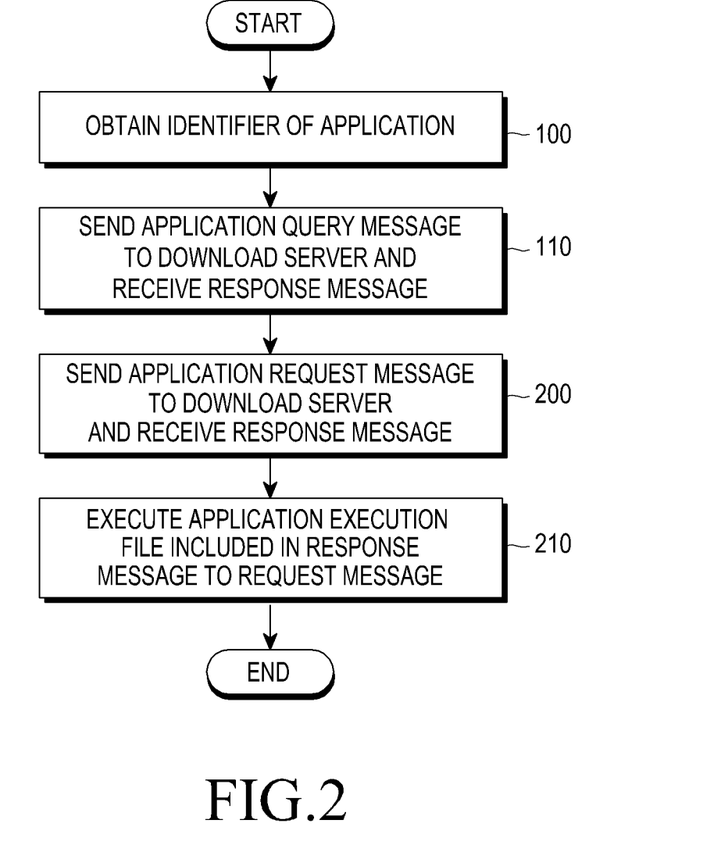
FIG. 2 illustrates a method for executing an application related to A/V content in an application execution device according to an exemplary embodiment of the present invention.

FIG. 2 illustrates a method for executing an application related to A/V content in an application execution device according to an exemplary embodiment of the present invention.

Referring to FIG. 2, steps 100 and 110 are substantially the same as those in FIG. 1, so a detailed description thereof will be omitted.

In step 200, the application execution device sends a request message for requesting the application to a download server and receives a response message to the request message from the download server.

The download server to which the application execution device sends the request message may be the same server as the download server to which the application execution device has sent the query message in step 110, or may be a new download server indicated by location information included in a response message to the query message. In other words, if a download server having received the query message may not provide the application queried by the query message, the download server may transmit location information of a new download server providing the application to the application execution device with a response message. By doing so, distributed services (i.e., distributed acceptance and delivery) of a plurality of applications are possible, and the application execution device may properly find an address of the download server providing the application.

Optionally, if the location information included in the response message received in step 110 is not the same as that of the download server to which the application execution device has sent the query message, the application execution device may further perform a process of sending a new query message to a new download server indicated by the location information and receiving a response message thereto, prior to sending the request message of step 200.

In step 210, the application execution device executes the application by executing an application execution file included in the response message to the request message.

Figure 3:
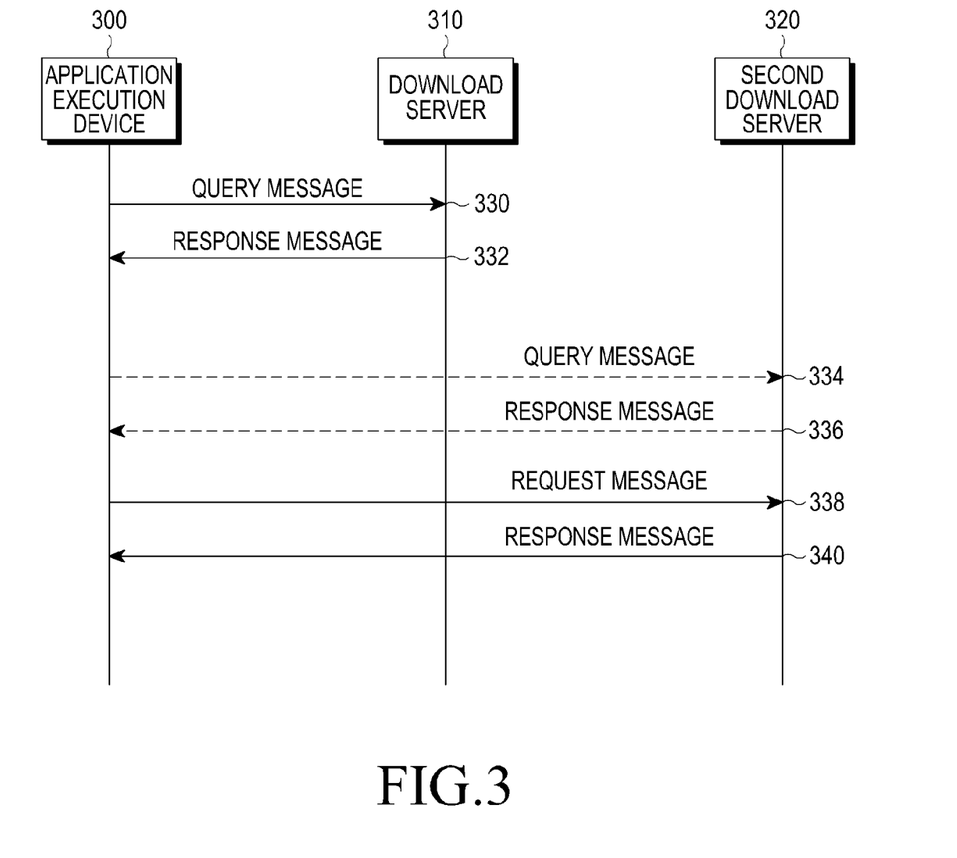
FIG. 3 illustrates a message flow between an application execution device and one or more download servers according to an exemplary embodiment of the present invention.

FIG. 3 illustrates a message flow between an application execution device and one or more download servers according to an exemplary embodiment of the present invention.

Referring to FIG. 3, an application execution device 300 sends a query message to a download server 310 in step 330 and receives a response message from the download server 310 in step 332.

If a download server, indicated by location information included in the response message of step 332, is a second download server 320 that is different from the existing download server 310, the application execution device 300 sends an application request message to the second download server 320 in step 338 and receives a response message from the second download server 320 in step 340.

Optionally, prior to sending the request message in step 338, the application execution device 300 may further perform a process of sending a new query message to the second download server 320 in step 334 and receiving a response message to the new query message in step 336 from the second download server 320. The message format and operation for the query message of step 334 and the response message of step 336 are substantially the same as those of the query message of step 330 and the response message of step 332 described above.

Figure 4:
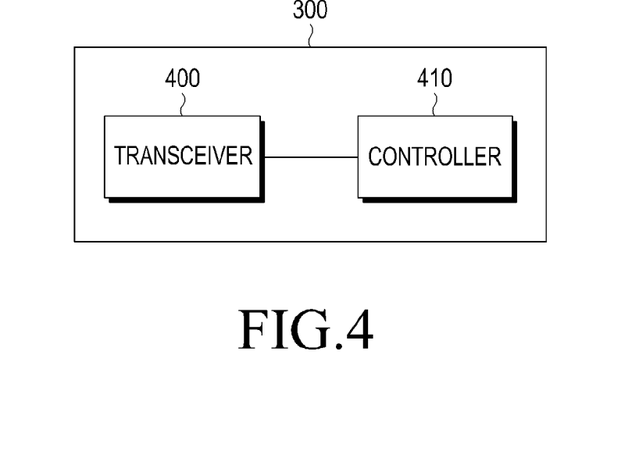
FIG. 4 illustrates a structure of an application execution device according to an exemplary embodiment of the present invention.

FIG. 4 illustrates a structure of an application execution device according to an exemplary embodiment of the present invention.

Referring to FIG. 4, the application execution device 300 includes a controller 410 and a transceiver 400 for sending and receiving various messages under control of the controller 410. In an exemplary implementation, the controller 410 may control execution of the operations described in FIGS. 1 and 2.

Figure 5:
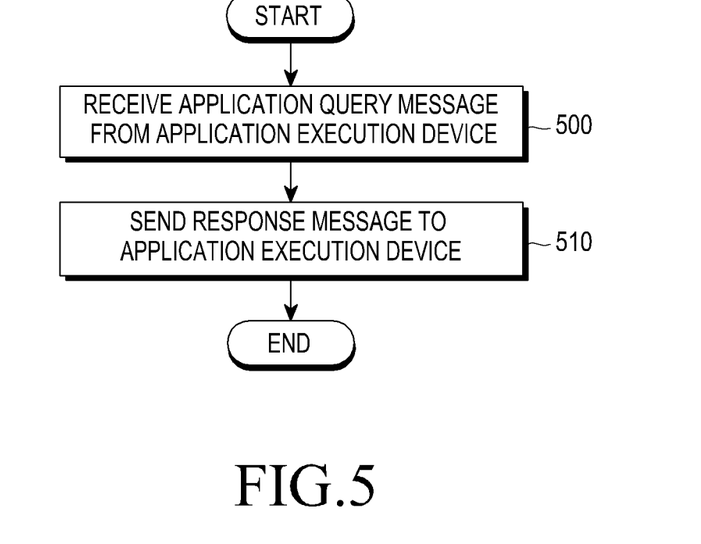
FIG. 5 illustrates a method for providing an application in a download server according to an exemplary embodiment of the present invention.

FIG. 5 illustrates a method for providing an application in a download server according to an exemplary embodiment of the present invention.

Referring to FIG. 5, the download server device receives a query message including an application identifier and platform information of an application execution device from the application execution device in step 500.

The application identifier is information that is independent of (or irrelevant to) a platform of the application execution device. Since the application identifier included in the received query message is independent of the type of the platform of the application execution device, application identifiers included in query messages received from a plurality of application execution devices whose users are viewing the same A/V content are all the same. Nevertheless, the download server device may inquire about application information appropriate for each application based on the platform information of the application execution device, included in the query message.

In step 510, the download server device sends a response message to the application execution device in reply to the query message. The response message may include information about the application the download server device has inquired based on the platform information.

The response message may optionally include at least one of version information, type and billing information (in the case of a paid application) of an application indicated by an application identifier included in the query message, location information (URL or an IP address) of a download server, an execution file, and the like. The application type information is information indicating whether the application is an application linked to data broadcast channels, or an application linked to data broadcast programs.

If the download server device may provide the application queried by the query message, the download server device may optionally send a response message including an execution file of the application. On the other hand, if the download server device may not provide the application queried by the query message, the download server device may send a response message including location information of another download server that can provide the application. By doing so, the download server device may redirect an application request received from the application execution device to a new download server in an appropriate location.

Optionally, the download server device may be a device merely serving as a Domain Name Server (DNS) that provides only information about the place where the application is located, without providing the application requested by the application execution device. In other words, if the number of applications increases exponentially due to the increase in format and type of A/V content and the use of various applications caused thereby, the download server serving as the DNS may be used as a device useful to provide distributed services of applications.

Figure 6:
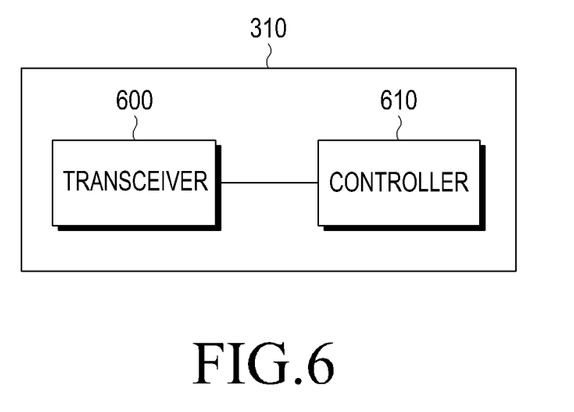
FIG. 6 illustrates a structure of a download server device according to an exemplary embodiment of the present invention.

FIG. 6 illustrates a structure of a download server device according to an exemplary embodiment of the present invention.

Referring to FIG. 6, the download server device 310 includes a controller 610 and a transceiver 600 for sending and/or receiving various messages under control of the controller 610. In an exemplary implementation, the controller 610 may control execution of the operations described in FIG. 5.

It should be noted that the flow of operations and the configuration of features illustrated in the drawings of the specification are not intended to limit the scope of the invention. In other words, each operation and component illustrated in the drawings is provided for illustrative purposes only, and the invention may be implemented with only some but not all processes and components in the drawings.

The above-described operations in FIGS. 1, 2, 3 and 5 may be implemented by mounting a memory device having stored therein the relevant program codes in an arbitrary component in the application execution device 300 or the download server device 310. In other words, an arbitrary component (or a combination of components) in the application execution device 300 or the download server device 310 may implement the above-described operations by reading and executing the program codes stored in the memory device by means of a processor or a Central Processing Unit (CPU).

As is apparent from the foregoing description, according to exemplary embodiments of the present invention, A/V content providers may easily create and provide applications related to A/V content regardless of the types of platforms of the devices executing applications, and may provide applications related to A/V content to A/V content consumers without the limitations on the existing A/V content broadcasting networks and the recording capacity of the media.

In addition, for applications related to A/V content, the A/V content providers may analyze information about the device and user language in which the applications are executed, at the time the A/V content is serviced in the future without specifying in advance the device and user language in which the applications are to be executed, and may provide applications appropriate for the analyzed information, making it possible to very flexibly cope with changes in user environment.

Further, the A/V content consumers may automatically detect the presence of information or applications related to A/V content when consuming the A/V content, and may easily purchase and execute the applications.

Besides, the A/V content consumers may easily download and execute applications related to the A/V content they are watching, regardless of the types of their application execution devices and the types of platforms of the application execution devices.

Moreover, as the download servers for providing applications related to A/V content may be operated in a distributed manner, the A/V content providers may easily provide the applications according to their needs, and the A/V content consumers may also download and execute their desired applications without additional search to download the applications.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A device for executing an application related to Audio/Video (A/V) content, the device comprising:
a controller configured to:
obtain an identifier of the application and an address of a download server at a time at which the A/V content is consumed,
send a query message including the identifier of the application and platform information of the device to the download server using the address, to receive a response message to the query message, and
execute the application based on information related to the application included in the response message; and
a transceiver configured to send the query message and to receive the response message,
wherein the identifier of the application is information that is independent of the platform of the device,
wherein the information related to the application includes at least one of location information of a download server configured to provide the application and an execution file of the application, and
wherein the location information of the download server and the execution file of the application are determined based on the platform information.

2. The device of claim 1, wherein the identifier of the application includes an identifier of the A/V content.

3. The device of claim 1, wherein the controller is further configured to:
determine whether the application is valid by analyzing application version information included in the response message, and
execute the application if the application is valid or execute the application by executing the execution file of the application included in the response message if the application is valid.

4. The device of claim 3, wherein the controller is further configured to:
control the transceiver to send a request message for requesting the execution file of the application to the download server,
control the transceiver to receive a second response message to the request message, and
execute the application by executing the execution file of the application included in the second response message.

5. The device of claim 3, wherein the controller is further configured to:
control the transceiver to send a request message for requesting the execution file of the application to a second download server indicated by location information included in the response message,
control the transceiver to receive a second response message to the request message from the second download server, and
execute the application by executing the execution file of the application included in the second response message.

6. The device of claim 1, wherein the identifier of the application is independent of a platform of the device.

7. The device of claim 1, wherein the device comprises a set-top box and the transmission media of the A/V content is broadcast and communication media.

8. The device of claim 1, wherein the device comprises a media play device, and the transmission media of the A/V content comprises media loaded on the media play device.

9. The device of claim 1, wherein the device comprises a mobile terminal device, and the controller is further configured to obtain the identifier of the application by wireless communication from a set-top box that obtains the identifier of the application through broadcast and communication media or a media play device that obtains the identifier of the application from media by reading the media.

10. The device of claim 1, wherein the platform information identifies a type of hardware included in the device and an execution environment of the hardware.

11. The device of claim 1, wherein the platform information identifies as least one of Open Cable Application Platform (OCAP) and Blu-ray Disc Java™ (BD-J).

12. A method of controlling a device for executing an application related to Audio/Video (A/V) content, the method comprising:
obtaining, from a separate device, an identifier of the application and an address of a download server at a time at which the A/V content is consumed;
sending a query message including the identifier of the application and platform information of the device to a download server using the address;
receiving a response message to the query message; and
executing the application based on information related to the application included in the response message,
wherein the identifier of the application is information that is independent of the platform of the device,
wherein the information related to the application includes at least one of location information of a download server configured to provide the application and an execution file of the application, and
wherein the location information of the download server and the execution file of the application are determined based on the platform information.

13. The method of claim 12, wherein the identifier of the application includes an identifier of the A/V content.

14. The method of claim 12, wherein the executing of the application comprises:
determining whether the application is valid by analyzing application version information included in the response message; and
executing the application if the application is valid, or executing the application by executing the execution file of the application included in the response message if the application is valid.

15. The method of claim 14, wherein the executing of the application comprises:
sending a request message for requesting the execution file of the application to the download server and receiving a second response message to the request message; and
executing the execution file of the application included in the second response message.

16. The method of claim 14, wherein the executing of the application comprises:
sending a request message for requesting the execution file of the application to a second download server indicated by address information included in the response message;
receiving a second response message to the request message from the second download server; and
executing the application by executing the execution file of the application included in the second response message.

17. The method of claim 11, wherein the identifier of the application is independent of a platform of the device.

18. A method for providing an application related to Audio/Video (A/V) content in a download server device, the method comprising:
receiving a query message including an identifier of the application and platform information of an application execution device, from the application execution device; and
sending a response message comprising information related to the application corresponding to the platform information to the query message
wherein the identifier of the application is information that is independent of the platform of the device,
wherein the information related to the application includes at least one of location information of a download server configured to provide the application and an execution file of the application, and
wherein the location information of the download server and the execution file of the application are determined based on the platform information.

19. The method of claim 18, wherein the response message includes at least one of the execution file of the application, type and version information of the application, billing information of the application, and address information of a second download server device providing the execution file of the application.

20. The method of claim 18, wherein the identifier of the application is independent of a platform of the application execution device.

21. The device of claim 6,
wherein the controller is further configured to
prior to the sending of the request message to the second download server, send a second query message to the second download server; and
in response to the second query message, receive a second response message from the second download server,
wherein the second query message includes the identifier of the application and the platform information of the device, and
wherein the second response message includes location information of the second download server and the execution file of the application.

* * * * *